US011410526B2

(12) United States Patent
Green (10) Patent No.: US 11,410,526 B2
(45) Date of Patent: Aug. 9, 2022

(54) DYNAMIC ROLLOVER ZONE DETECTION SYSTEM FOR MOBILE MACHINERY

(71) Applicant: Lantern Holdings, LLC, Sterling, VA (US)

(72) Inventor: Chad Thomas Green, Sterling, VA (US)

(73) Assignee: LANTERN HOLDINGS, LLC, Sterling, VA (US)

( * ) Notice: Subject to any disclaimer, the term of this patent is extended or adjusted under 35 U.S.C. 154(b) by 391 days.

(21) Appl. No.: 16/709,695

(22) Filed: Dec. 10, 2019

(65) Prior Publication Data

US 2020/0189507 A1 Jun. 18, 2020

Related U.S. Application Data

(60) Provisional application No. 62/778,695, filed on Dec. 12, 2018.

(51) Int. Cl.
| | | |
|---|---|---|
| *G08B 21/18* | (2006.01) | |
| *G08B 21/02* | (2006.01) | |
| *G08B 25/10* | (2006.01) | |
| *G08B 7/06* | (2006.01) | |
| *B60Q 1/52* | (2006.01) | |
| *B60Q 5/00* | (2006.01) | |
| *B60Q 9/00* | (2006.01) | |
| *B60R 1/00* | (2022.01) | |
| *B60R 21/013* | (2006.01) | |
| *E02F 9/26* | (2006.01) | |

(Continued)

(52) U.S. Cl.
CPC ............... *G08B 21/18* (2013.01); *B60Q 1/52* (2013.01); *B60Q 5/005* (2013.01); *B60Q 9/00* (2013.01); *B60R 1/00* (2013.01); *B60R 21/013* (2013.01); *E02F 9/267* (2013.01); *F16P 3/00* (2013.01); *F16P 3/001* (2013.01); *F16P 3/08* (2013.01); *F16P 3/12* (2013.01); *G08B 7/06* (2013.01); *G08B 21/02* (2013.01); *G08B 25/10* (2013.01); *B60R 2300/105* (2013.01); *B60R 2300/20* (2013.01); *B60R 2300/80* (2013.01)

(58) Field of Classification Search
CPC ........ G08B 21/18; G08B 21/02; G08B 25/10; B60Q 1/12; B60Q 5/005; B60Q 9/00; B60R 1/00; B60R 21/013; B60R 2300/105; B60R 2300/20; B60R 2300/80; E02F 9/267; F16P 3/00; F16P 3/001; F16P 3/08; F16P 3/12
USPC .......................................................... 701/50
See application file for complete search history.

(56) References Cited

U.S. PATENT DOCUMENTS

| | | | |
|---|---|---|---|
| 6,397,133 B1 * | 5/2002 | van der Pol | ........ B60R 21/0132 340/440 |
| 7,085,637 B2 * | 8/2006 | Breed | .................... G08G 1/163 701/470 |

(Continued)

*Primary Examiner* — Gertrude Arthur Jeanglaude
(74) *Attorney, Agent, or Firm* — Birch, Stewart, Kolasch & Birch, LLP (57) ABSTRACT

A dynamic rollover zone detection system that is easily attached to mobile machinery and dynamically detects a rollover zone around the mobile machinery. The system detects humans and objects within the rollover zone using one or more pre-trained machine learning models in order to prevent accidents and potential collisions between machinery and people or objects in the rollover zone. If a human or obstacle is identified in the rollover zone, an alert or warning is provided and/or the mobile machinery is disabled.

10 Claims, 5 Drawing Sheets

(51) Int. Cl.
*F16P 3/00* (2006.01)
*F16P 3/08* (2006.01)
*F16P 3/12* (2006.01)

(56) References Cited

U.S. PATENT DOCUMENTS

| | | | | |
|---|---|---|---|---|
| 7,103,460 B1* | 9/2006 | Breed | ............... | G07C 5/008 |
| | | | | 706/15 |
| 7,769,513 B2* | 8/2010 | Breed | ............... | B60N 2/028 |
| | | | | 701/45 |
| 7,840,342 B1* | 11/2010 | Breed | ............... | G08G 1/161 |
| | | | | 340/436 |
| 2011/0022267 A1* | 1/2011 | Murphy | ............ | B60W 50/14 |
| | | | | 701/124 |
| 2018/0162410 A1* | 6/2018 | Skillsäter | ......... | B60W 50/14 |

* cited by examiner

DYNAMIC ROLLOVER ZONE DETECTION SYSTEM FOR MOBILE MACHINERY

CROSS-REFERENCE TO RELATED APPLICATIONS

This application claims the benefit under 35 U.S.C. § 119(e) of the filing date of U.S. Patent Application No. 62/778,695, for Safety Systems And Methods, which was filed on Dec. 12, 2018, and which is incorporated here by reference.

BACKGROUND

This specification relates to using machine learning for rollover and back-over protection.

Each year, numerous worker fatalities occur during road construction. The Federal Highway Administration has found that rollover or back-over incidents are the source of approximately half of these fatalities.

In a typical road construction work zone, slow-moving mobile machinery as well as fast-moving trucks are constantly entering and exiting the work zone causing many opportunities for rollover and back-over incidents. Further, fatigued and/or distracted workers are sometimes found operating these pieces of equipment.

Although backup cameras are available in some vehicles they are rare on mobile machinery. Backup cameras can help drivers visualize the area behind their machinery and can help prevent some rollover or back-over accidents, but the responsibility for monitoring the camera lies with the potentially fatigued and/or distracted operator. Therefore, even with conventional backup cameras, rollover incidents remain a high and hazardous risk for workers within a construction zone.

SUMMARY

This specification describes technologies relating to work zone safety in general, and specifically to a dynamic rollover zone detection system for mobile machinery, e.g., construction vehicles.

The subject matter described in this specification can be implemented in particular embodiments so as to realize one or more of the following advantages.

An example dynamic rollover zone detection system detects humans and objects within a rollover zone to prevent accidents and potential collisions between machinery and people or objects in the work zone. System sensors are robust so that they can survive harsh conditions in construction environments. These sensors can also be easily installed on mobile machinery.

An exemplary system can detect objects in a machine's path and provide warning alerts to prevent rollovers or collisions with the objects. The system may provide urgent warnings when detecting humans or animals as opposed to inanimate objects.

If a rollover zone detection device of an example system is forgotten or not removed before a machine or vehicle leaves a work zone, a sensor of the rollover zone detection device may trigger a signal to remind the driver to return the device to the work zone.

With several different sensors that identify people and objects in the work zone, the example system has a low false alarm rate and provides drivers with accurate warnings to prevent collisions. This provides a safer work zone and can mitigate many rollovers or collisions from occurring between machines and humans.

The system requires no calibration; a user only needs to point the sensor at the desired protected area. It is installed with magnetic, suction, or other common mounting equipment and simply needs to be pointed at the area of concern, i.e., behind or in front of the mobile machinery or keepout zone. To ensure appropriate coverage, the system may include a video display of the sensor's field of view, allowing the sensors to be easily oriented and emplaced. After emplacement, the system is fully hands-off. It finds the boundary of the mobile machinery determines the hazardous rollover zone automatically.

The details of one or more embodiments of the invention are set forth in the accompanying drawings which are given by way of illustration only, and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a rollover zone detection system that dynamically detects people and other obstacles in a rollover zone.

Figure 1:
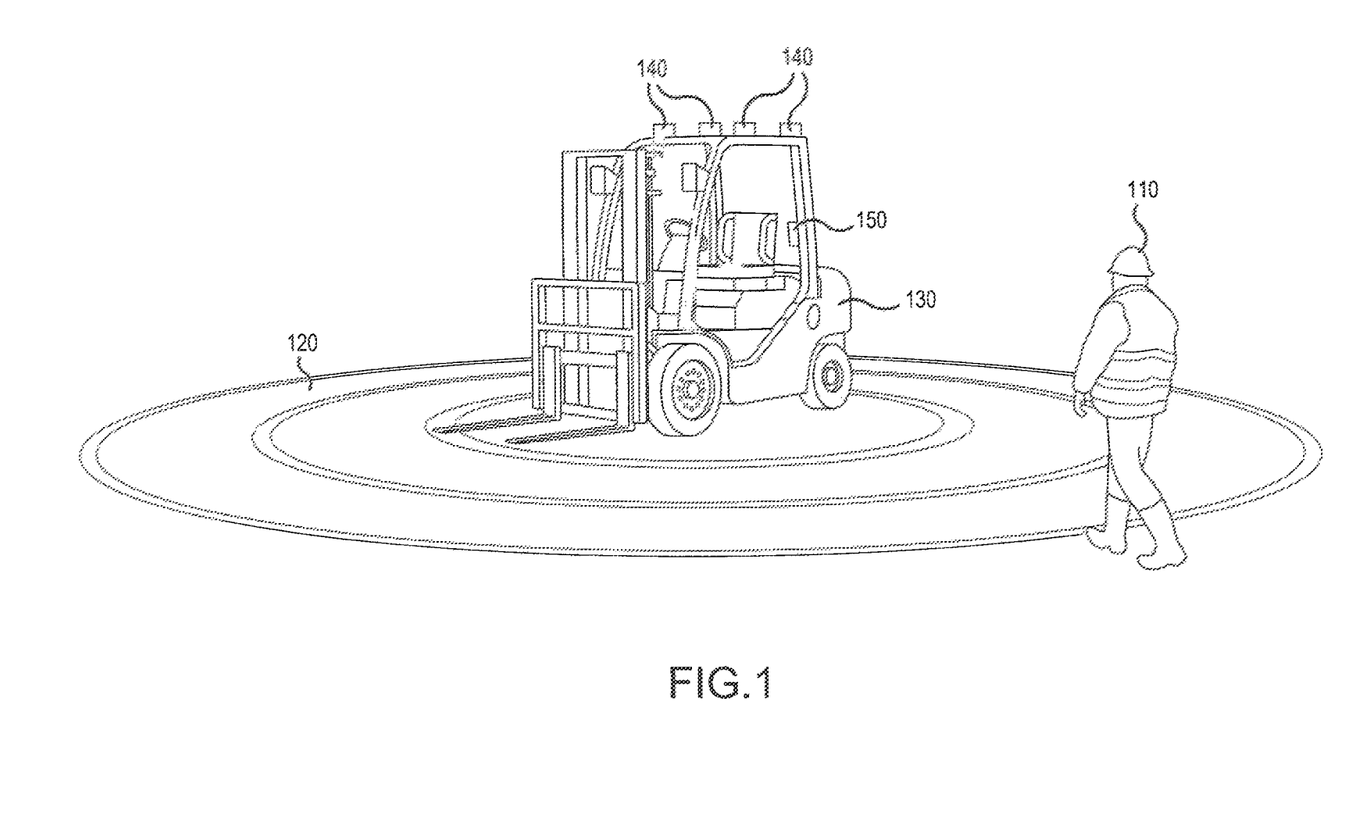
FIG. 1 is a diagram illustrating a dynamic rollover zone detection system that detects people and objects within the rollover zone.

An example human 110 and rollover zone 120 of a rollover zone detection system 200, as illustrated in FIG. 1, dynamically determines the presence of objects, e.g., people, animals, or construction materials, and the location of the objects in relation to mobile machinery 130, e.g., dump trucks, excavators, and similar mobile construction machinery. The system obtains environmental information from areas surrounding the mobile machinery 130 using a rollover zone detection device 210 that includes one or more sensors 140, an alerting and/or disabling device 150 and a processing device 212, which contains one or more machine learning models 214, e.g., a neural network, that have been pre-trained to process information from the one or more sensors 140. The pre-trained neural network can determine the presence of human(s) 110 or other obstacles within a rollover zone 120.

The rollover zone system dynamically detects humans 110 and other objects within a rollover zone 120 surrounding the mobile machinery 130. The rollover zone 120 is a defined area surrounding the machinery which identifies a danger area around the mobile machinery. The rollover zone 120 is dynamic and moves with the mobile machinery 130 maintaining the same parameters around the mobile machinery 130. The rollover zone 120 dimensions and boundaries are determined automatically and dynamically by the neural network which is trained to determine the physical dimensions of the mobile machinery 130 that it is mounted to and extend a default hazard zone boundary by 1 to 3 meters, in a preferred embodiment 2 meters, beyond the dimensions of the mobile machinery 130. The boundaries are continuously updated as the mobile machinery performs its operations within the work zone. The boundary dimensions may be customized or reconfigured by the user at any time through the use of an accompanying mobile application.

In embodiments of the invention, the one or more sensors 140 when placed on the mobile machinery 130 may include a display showing the extents of the field of view of the one or more sensors 140. This allows the user or installer to determine the area of the rollover boundary which is covered by any particular sensor. In other embodiments, the one or more sensors 140 may share information to a central display 160 and/or processor 212 which aggregates multiple sensor fields of view and determines if full coverage around the equipment has been achieved. The information processed by the processor 212 and/or displayed the central display 160 may show, for example, a top-down view of the equipment with surrounding field of view of each sensor, to aid in repositioning the one or more sensors 140 or adding additional sensors 140 to achieve full coverage.

The human form 110 and rollover zone system of FIG. 1 includes a rollover zone detection device 210 and an optional machine disabling device 170. An example rollover zone detection device 210 includes one or more sensors 140. These sensors are capable of easily and quickly being installed on the mobile machinery 130, e.g., magnetic or other installation without requiring alignment or calibration. Such installation can be quickly accomplished on any mobile machinery 130 entering a work zone. In some implementations, a rollover zone detection device 210 may be installed where a sensing element can sense an area behind the vehicle and the driver can view an alerting device 150 in his rear-view mirror. While the rollover detection device 210 needs to be installed in an area that maintains line of sight to the hazardous area, the rollover zone 120, the machine disabling device 170 may be optionally mounted near a brake pedal or cutoff switch of the machine. The machine disabling device 170 may include a cable and pulley system to electromechanically engage the brake pedal, but may also be comprised of an electromechanical relay, solid-state switch, or other implement that disables power or motion of the mobile machinery 130. Additionally, a warning may be issued to the operator of the mobile machinery 130 via the operator warning device 180 in the form of one or more of messages that are displayed through existing user interfaces, a warning light, an acoustic alert, and/or vibratory alert to draw attention to the potential hazard.

The rollover zone detection device 210 and the disabling device 170 may both be battery-powered units that require no electrical interfaces with a vehicle. The rollover zone detection device 170 may have both sensing devices 140, described below, and one or more alerting devices 150 for both an operator as well as a human 110 within the rollover zone 120. An alert device provides an alert to all those in the immediate proximity of the mobile machinery 130. The rollover zone detection system 200 may include one or more alert devices 150. The alert device 150 may include strobe lights, sirens, or electronic displays with warning information or any other audible or visual warning device. In some implementations, the rollover zone detection device 210 may connect each of the one or more sensors 140, one or more alert devices 150, display 160, one or more operator warning devices 180 to the disabling device 170 each by a wired or wireless connection.

The rollover detection device 210 signals to the disabling device when to disable the mobile machinery 130. In some implementations, when the disabling device 170 receives a signal from the rollover zone detection device 210 that there is danger or that the mobile machinery 130 should be disabled, the disabling device 170 will disable the mobile machinery 130. In other implementations, when the disabling device 170 receives a signal from the rollover zone detection device 210 that the mobile machinery 130 should be disabled, the disabling device 170 alerts the driver to the potential issues and requires the driver to ultimately disable the mobile machinery 130.

Figure 2:
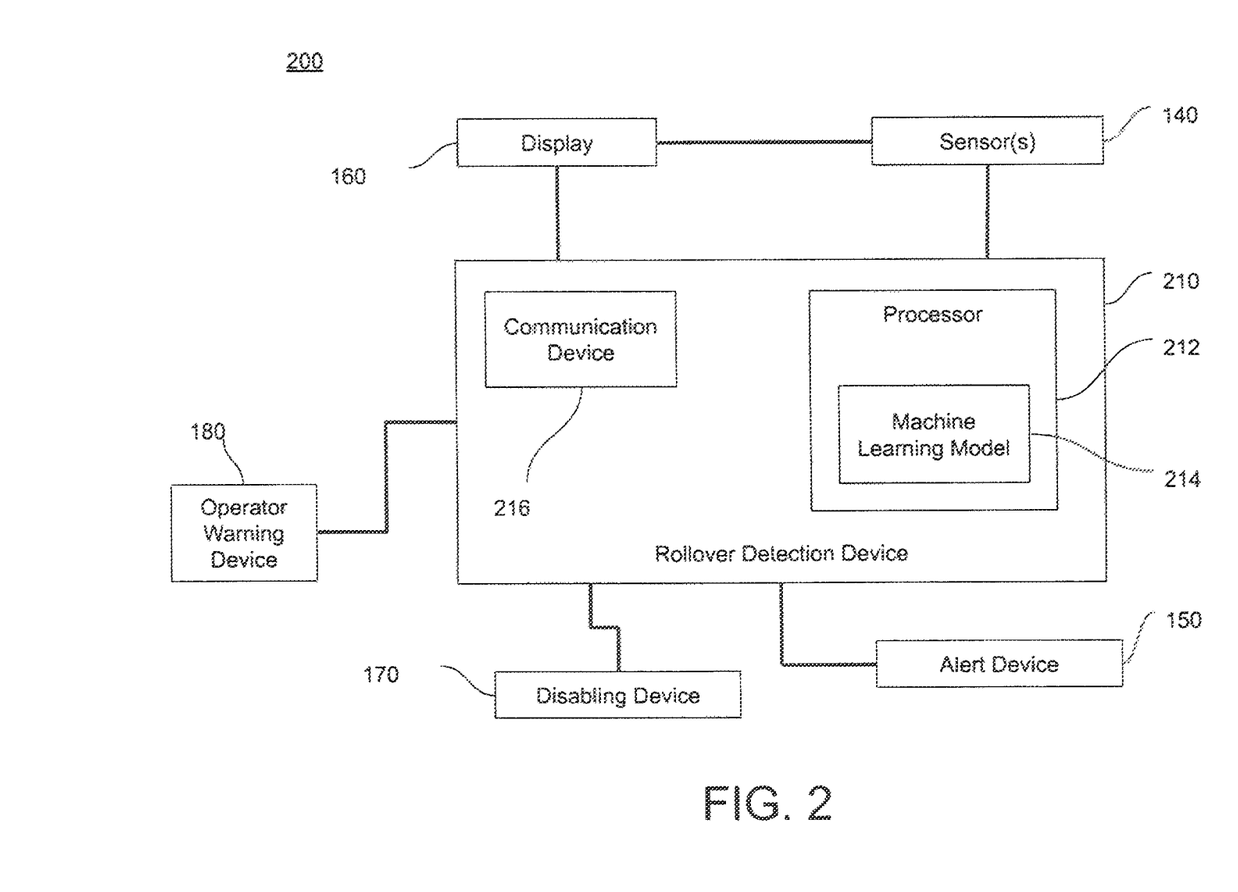
FIG. 2 is a diagram illustrating an example rollover zone detection device.

FIG. 2 is a diagram illustrating an example rollover zone detection system 200. The rollover zone is dynamically and automatically determined by the rollover detection device 210. This is achieved through the process of collecting training data, annotating that data with the desired zone boundaries, and then training a neural network do the same on live data that it has never processed before. For example, if the sensor were a RGB-D depth camera (providing standard RGB images as well as depth measurements for each pixel in the frame) and it was mounted to the back of a loader, the corresponding video would provide a field of view which includes the back of the loader as well as at least 2 meters beyond the back of the loader. The training process would then proceed as follows: the camera would be enabled to record video continuously during normal operation of the loader for several days or throughout several use case scenarios. These scenarios should be representative of the full envelope of operations that the loader is intended to perform. Additionally, the camera would be remounted in various locations to provide different perspectives of the same use case scenarios. These videos would then be transmitted to a computer workstation, whether in the cloud or in a local office, where personnel would select a sampling of sequences that properly summarize all the relevant use case scenarios. Each frame of the video sequences would then be annotated by drawing a polygon beginning at the back edge of the loader and circumscribing any area within a 2 meter radius that is within the camera's field of view. Additionally, humans within the field of view (or the portion of the human that is within the field of view) is/are circumscribed with a polygon. Each polygon is then labeled with a respective label of "keepout zone", "person", or other relevant label. After all annotations are complete, the database is split into a training and testing set. The training set is used to train the neural network, and the testing set is used to evaluate the training. Once training is complete, the network is frozen and optimized to be deployed to a small processor which processes the live video, drawing the aforementioned polygons automatically in real-time during live operation of the loader. This processor may be co-located with the camera on the loader. The polygons now classify each RGB-D pixel (commonly known by the industry as a voxel) as "keepout zone", "person", or other relevant label. Whenever "person" voxels and "keepout zone" voxels overlap, the system may warn the driver or stop the loader. The process of collecting, annotating, and training on data may be repeated until satisfactory performance is achieved. Additionally, the previously-trained network can help to annotate future videos, automating the process such that manual annotation is necessary only to make corrections to the polygons. This includes aiding in the annotation of videos from cameras mounted on entirely different machines or in new scenarios which the network has never seen before. Therefore, annotation, and ultimately, improved performance becomes more and more automated with future implementations of the system. Once this training is complete it is deployed to the system.

In embodiments of the present invention, the one or more sensors 130 include one or more cameras. These are preferably depth cameras but can be any camera suitable to provide environmental imagery of the area surrounding the mobile machinery 130. Depth cameras are very effective at detecting humans and gestures. Some depth cameras use a pulse of invisible infrared light to illuminate a field of view. The pulse is modulated with a sine wave so that the reflected light received by each pixel can be compared in both amplitude as well as phase of the received sine wave. Since the phase shift is proportional to the time required for light to travel out and back, e.g., time-of-flight, the detected phase is proportional to the distance traveled. Each pixel is therefore able to detect distance as well as the amplitude of reflected light. Using depth cameras, the human and rollover zone detection system can easily determine shape, size, and distance of objects within a rollover zone. Such cameras may include a 3D camera system such as a stereoscopic camera, structured light camera, time-of-flight camera or other depth camera.

Each of the one or more sensors 140 of the rollover zone detection system 200 may be easily or temporarily mounted to mobile machinery 130, e.g., a loader, dump truck, roller, paving system, milling machine, or shuttle buggy. Since the one or more sensors 140 are trained in various orientations and perspectives, the system is unaffected by minor misalignments and does not require calibration. An example sensor may have a self-cleaning lens system to ensure reliable operation in extremely dirty environments. An example sensor may also have a self-diagnosing ability to alert a user/operator if the sensor has been compromised and no longer functions properly.

Other depth cameras may use an infrared projector to sense structured light, e.g., a known pattern across a scene. An infrared imager may capture deformations in the pattern caused by three-dimensional objects in the scene. Stereoscopic images may capture disparity and parallax based on the distance between imagers. An on-board processor of the depth camera system may reconstruct the 3D scene from a fusion of all sensor data.

In some implementations, an example rollover zone detection device may use advanced computer vision techniques using one or more machine learning models 214 such as deep convolutional neural networks to detect, classify, and localize objects in images.

Neural networks are machine learning models that employ one or more layers of neurons to generate an output, e.g., one or more classifications, for a received input. Neural networks may include one or more hidden layers in addition to an output layer. The output of each hidden layer can be used as input to the next layer of the network, i.e., the next hidden layer or the output layer, and connections can also bypass layers, or return within the same layer such as in the case in a recurrent network unit. Each layer of the neural network generates an output from its inputs in accordance with the network architecture and a respective set of parameters for the layer. In addition to typical weights and biases that are trained through customary practices, such as but not limited to stochastic gradient descent, the network may include gates to hold memory as well as gates to remove data from memory such as in a Long Short-Term Memory (LSTM) network. A stateful network such as the LSTM aids in sequence classification and allows the network to understand the context of current data based on prior events.

A machine learning model 214 of an example human and rollover zone detection system 200 may be trained to detect objects within a scene. Additionally, the system may be able to segment objects from the background of a scene at the pixel level. In some implementations, the system can use a technique called panoptic segmentation which involves classifying each pixel in an image as belonging to a specific class and identifying instances of each specific class in the image. The system may be able to reliably perform human detection in two-dimensional images or three-dimensional images using these techniques. Using these techniques, the hand may be segmented from the shovel or tool that the hand is holding. In this manner, the shovel may be allowed to be detected within a specified rollover zone 120, but the hand is not.

In some implementations, a machine learning model 214 may be trained for pose estimation. Deep convolutional neural networks may detect key points in an image to identify specific parts, e.g., joints, eyes, and ears. These points may then be correlated and grouped into instances of a class. A system may draw lines between the determined key points to obtain a skeletal output of an object or a person.

A rollover zone detection system 200 may use time sequence classification to interpret body language and gestures from video. This technique can be used to interpret the worker's actions when, for example, operating near mobile machinery 130 and ensure that they are appropriate for the task. For example, gestures classified as digging, smoothing, spreading, and inspecting may be acceptable when working near an asphalt paving machine, but eating, sitting, or fighting may not be. The mobile machinery 130 may be disabled by the disabling device 170 or a warning may be generated by the alert device 150 and/or operator warning device 180 when unacceptable gestures are detected.

In an example rollover zone detection system 200, an example rollover zone detection device 210 may include a thermal imager as a sensor 140. The thermal imager may act as a backup to the depth camera to confirm the presence of a human limb or another object. To be classified as human, a thermal object should have the proper shape (as determined by the previously-described machine learning model 214), as well as a thermal signature representative of a human in the given ambient temperature conditions and climate. Many thermal imagers are available with varying degrees of resolution. In some implementations, the system may use a passive sensor such as a PIR, which is capable of detecting black-body radiation from a human. When used in conjunction with an imaging sensor, such as the aforementioned depth cameras, a one or two zone PIR may have sufficient resolution to verify that the human object found by the machine learning model 214 is indeed human and not an image of a human.

In some implementations, the example system may use radar sensors. Radars can be used for pedestrian detection. These sensors have small wavelengths which allows for higher angular resolution that provides a good position estimate for small objects within a field of view.

Although radar sensor wavelengths are much longer than thermal or infrared and are capable of sensing through dust, mist, rain, and snow, these sensors cannot distinguish humans from other objects so an example system requires additional sensors for determining humans or animals within a work zone.

Figure 3:
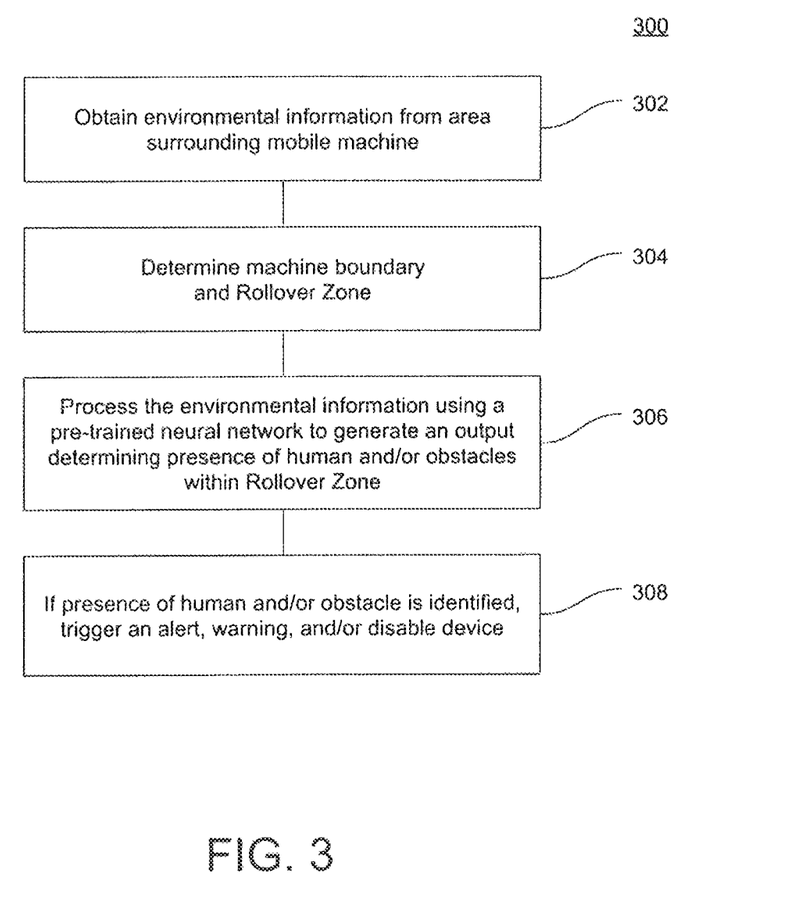
FIG. 3 is a flow diagram illustrating an example process for dynamically detecting people and objects using an example rollover zone detection device and a disabling device.

FIG. 3 is a flowchart of an example process for dynamically detecting people and objects using an example rollover zone detection device 210 and a disabling device 170 to detect the presence of a human within a rollover zone 120. For example, a rollover zone detection system 200, e.g., the rollover zone detection system of FIG. 1, appropriately programmed, can perform the process 300.

The rollover zone detection system 200, once installed on the mobile machinery 130, obtains environmental information from areas surrounding the mobile machinery 130 from the one or more sensors 140 (302). The rollover zone detection system 200 may actively receive continuous sensor data from one or more sensors 140 or may passively receive sensor data, e.g., on timed intervals. This may also be determinative of the type of sensor used and can vary from each sensor. Once the environmental information is received, the system determines the rollover zone 120 and boundary of the mobile machinery 130 (304). The rollover zone 120 is dynamically determined as the mobile machinery 130 moves, thus providing a continuous rollover zone 120 around the mobile machinery 130 at all times. In some implementations, the system stores the sensor data in memory, either short-term or long-term, prior to processing. The system then processes the obtained/received environmental information using a machine learning model 214 to generate an output determining the presence of humans or obstacles within a rollover zone 120 (306). As described above, the pre-trained machine learning model 214 may perform an inference process that requires the machine learning model 214 to extract and sort time series data from frames created from one or more sensors 140. The machine learning model 214 may also extract human forms from the scene. The output of the machine learning model 214 may be a classification of each pixel (or voxel) within the camera's field of view as one of the classes that it was trained to detect, e.g. "person", "machine", "rollover zone", etc. Additionally, a time-series classification may classify gestures or actions, e.g., "working", "sitting", "fighting", etc.

If a human is determined to be within the rollover zone 120, the system may trigger an alert to one or more of a disabling device 170, an alert device 150 and an operator warning device 180 (308).

Figure 4:
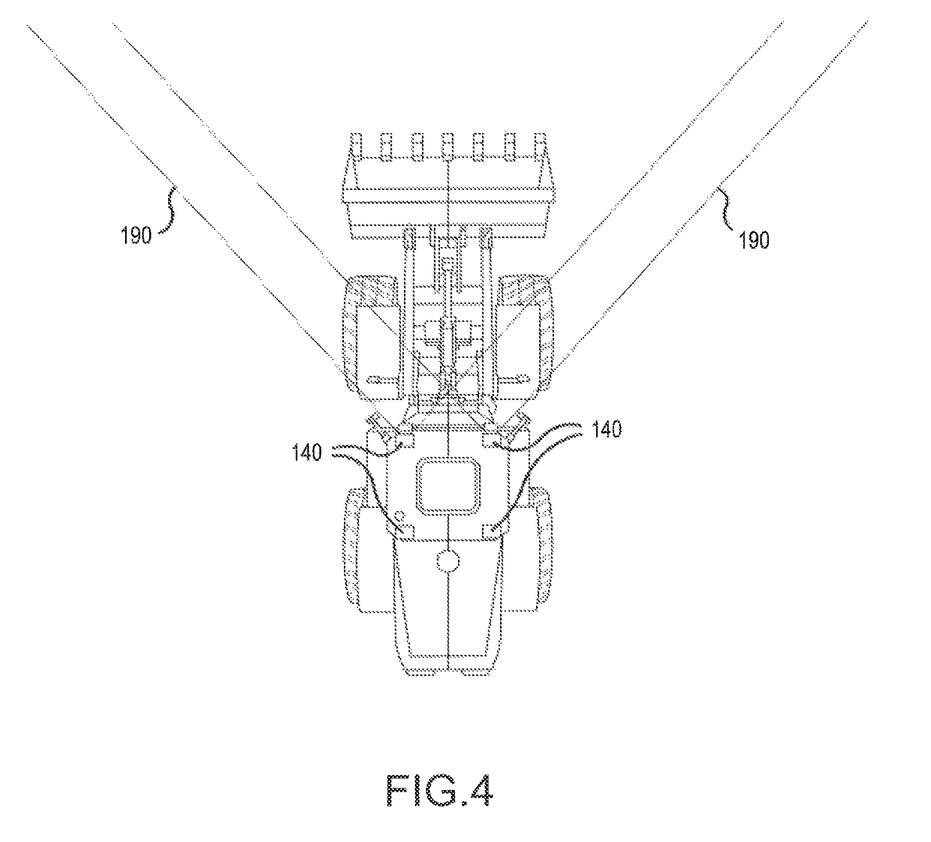
FIG. 4 illustrates an embodiment of the rollover zone detection system sensor coverage.

FIG. 4 is an exemplary embodiment illustrating the rollover zone detection system 200 attached to the mobile machinery 130 and illustrating the view 190 of the one or more sensors 140 attached to the mobile machinery 130. While this embodiment illustrates the sensors 140 attached to the top of the cab of the mobile machinery 140, this is for illustrative purposes and the one or more sensors 140 can be attached on any area of the mobile machinery 130 that provides coverage for the rollover zone 120. The field of view 190 of the front two sensors 140 is illustrated to show their respective coverage area. The most dangerous area of the rollover zone 120 may be the area relevant to directional movement of the mobile machinery 130 and therefore may require prioritized coverage in those areas. For some mobile machinery 130 this may mean that sensor coverage on one or more sides of the mobile machinery 130 is not necessary as they do not create a danger area. However, coverage may be accomplished and included in any area of the rollover zone 120 by the addition of more sensors 140.

Each sensor 140 may include a display for visualizing the coverage area of each individual sensor, e.g., camera. Furthermore, a central display 160 may be included and utilized to collect and visualize the coverage area of the aggregated fields of view for the rollover zone detection system 200.

Figure 5A:
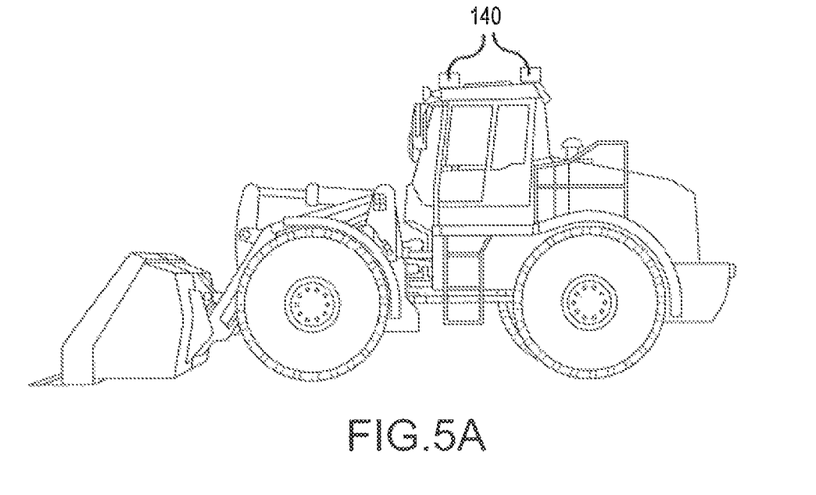
FIG. 5A-5C is an exemplary embodiment showing different views of the same mobile machinery and sensor placement.
Figure 5B:
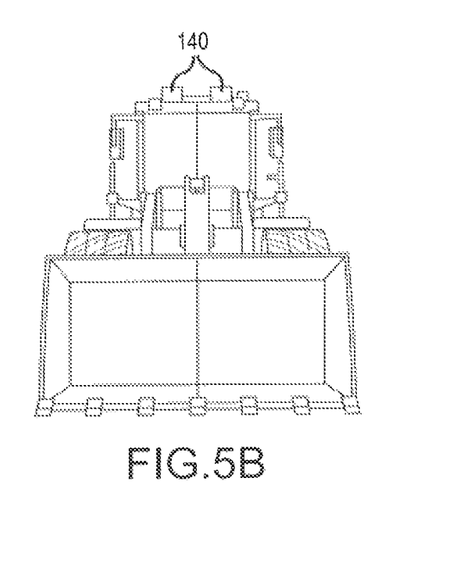
Figure 5C:
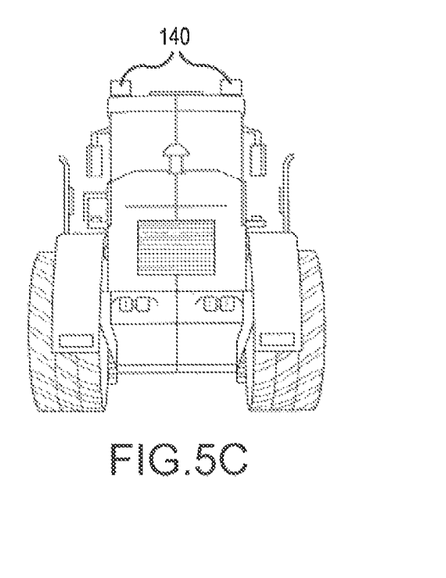

FIGS. 5A-5C show the embodiment of FIG. 4 at different viewpoints and shows the placement of the one or more sensors 140 on the top of the cab of the mobile machinery 130. Four sensors are placed on the top of the cab to provide full coverage view 190 of the front and rear direction of movement. Additional sensors could be attached to the side of the cab to provide coverage of the sides, if desired.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A dynamic rollover zone detection system for mobile machinery, the system comprising:
   a warning device that provides an acoustic, haptic, and/or visual warning;

one or more sensors for sensing an area surrounding the mobile machinery and detecting human presence in a dynamic rollover zone; and a rollover zone detection device, including:
- a processor that includes one or more pre-trained machine learning model that dynamically determines the boundaries of the rollover zone surrounding the mobile machinery from imaging information received from the one or more sensors; the machine learning model also processes information from the one or more sensors and the sensor information to determine the presence of a human within the rollover zone, wherein the warning device is activated by the processor to provide an alert and/or disable the mobile machinery when the human is determined to be within the rollover zone.

2. The dynamic rollover zone detection system of claim 1, wherein the one or more sensors include one or more of a camera, a thermal imager, lidar, ultrasonic sensor, or radar.

3. The dynamic rollover zone detection system of claim 1, wherein the one or more sensors include one or more depth cameras.

4. The dynamic rollover zone detection system of claim 1, further including a disabling device that disables mobile machinery when the warning device is activated.

5. The dynamic rollover zone detection system of claim 1, further including a display which indicates the field of view of the sensor to the user.

6. The dynamic rollover zone detection system of claim 1, wherein the sensors may be attached in any location or orientation to capture the desired field of view.

7. The dynamic rollover zone detection system of claim 1, wherein the human is detected by a pre-trained machine learning model.

8. The dynamic rollover zone detection system of claim 1, wherein a notification is provided to the user if the rollover zone detection device is not removed from the mobile machinery upon leaving a work zone.

9. The dynamic rollover zone detection system of claim 1, the boundary of the mobile machinery and the hazardous rollover zone are determined automatically upon emplacement of the one or more sensors on the mobile machinery.

10. A method for dynamic rollover zone detection for mobile machinery, the method comprising:
- attaching one or more sensors to the mobile machinery;
- obtaining information from the one or more sensors of the area surrounding the mobile machinery; and
- determining dynamically, by a processor that includes a pre-trained machine learning model, the boundaries of the rollover zone surrounding the mobile machinery from the imaging information received from the one or more sensors; the machine learning model also processing information from the one or more sensors and the imaging information to detect the presence of the human within the rollover zone; and
- activating a warning device to provide an alert and/or disable the mobile machinery when the human is determined to be within the rollover zone.

* * * * *